United States Patent
Sala et al.

(10) Patent No.: US 12,227,153 B2
(45) Date of Patent: Feb. 18, 2025

(54) HYDRAULIC AND ELECTROMECHANICAL SERVICE AND PARKING DISC BRAKE

(71) Applicant: Brembo S.p.A., Bergamo (IT)

(72) Inventors: Paolo Sala, Bergamo (IT); Martina Truffello, Bergamo (IT); Corrado Manzoni, Bergamo (IT)

(73) Assignee: Brembo S.p.A., Bergamo (IT)

( * ) Notice: Subject to any disclaimer, the term of this patent is extended or adjusted under 35 U.S.C. 154(b) by 378 days.

(21) Appl. No.: 17/631,513

(22) PCT Filed: Jul. 23, 2020

(86) PCT No.: PCT/IB2020/056934
§ 371 (c)(1),
(2) Date: Jan. 31, 2022

(87) PCT Pub. No.: WO2021/019380
PCT Pub. Date: Feb. 4, 2021

(65) Prior Publication Data
US 2022/0266808 A1 Aug. 25, 2022

(30) Foreign Application Priority Data
Jul. 31, 2019 (IT) .................... 102019000013512

(51) Int. Cl.
*F16D 65/18* (2006.01)
*B60T 13/58* (2006.01)
(Continued)

(52) U.S. Cl.
CPC ............ *B60T 13/66* (2013.01); *B60T 13/588* (2013.01); *B60T 13/746* (2013.01);
(Continued)

(58) Field of Classification Search
CPC ............ F16D 2125/40; F16D 2125/48; F16D 55/228; F16D 65/18; F16D 2121/04;
(Continued)

(56) References Cited

U.S. PATENT DOCUMENTS 5,348,123 A * 9/1994 Takahashi ............. B60T 13/745
188/162
6,305,508 B1 * 10/2001 Schumann ............ B60T 13/741
188/72.8
(Continued)

OTHER PUBLICATIONS

European Patent Office, International Search Report and Written Opinion in Application No. PCT/IB2020/056934, dated Sep. 25, 2020, Rijswijk, Netherlands.

*Primary Examiner* — Bradley T King
(74) *Attorney, Agent, or Firm* — Marshall & Melhorn, LLC

(57) ABSTRACT

A hydraulic and electromechanical service and parking disc brake may have a service braking system, having at least one hydraulic actuator, a parking braking system having at least one electromechanical actuator transmission irreversibility, a control system connected to the service braking system and to the parking system and a user interface. A translational member of the electromechanical actuator is restrained to be rotationally integral with respect to the caliper via an anti-rotation shape coupling with a guide portion which is integral with the caliper and arranged on a rear side of the translational member, opposite to the free end.

15 Claims, 8 Drawing Sheets

(51) Int. Cl.
  *B60T 13/66* (2006.01)
  *B60T 13/74* (2006.01)
  *F16D 55/228* (2006.01)
  *F16D 121/04* (2012.01)
  *F16D 121/24* (2012.01)
  *F16D 123/00* (2012.01)
  *F16D 125/08* (2012.01)
  *F16D 125/40* (2012.01)
  *F16D 125/50* (2012.01)
  *F16D 125/52* (2012.01)

(52) U.S. Cl.
  CPC ............ *F16D 55/228* (2013.01); *F16D 65/18* (2013.01); *F16D 2121/04* (2013.01); *F16D 2121/24* (2013.01); *F16D 2123/00* (2013.01); *F16D 2125/08* (2013.01); *F16D 2125/40* (2013.01); *F16D 2125/50* (2013.01); *F16D 2125/52* (2013.01)

(58) Field of Classification Search
  CPC ............ F16D 2121/24; F16D 2123/00; F16D 2125/08; F16D 2125/50; F16D 2125/52; B60T 13/746; B60T 13/66; B60T 13/588
  USPC ........................................................ 188/162
  See application file for complete search history.

(56) References Cited

U.S. PATENT DOCUMENTS

| | | | |
|---|---|---|---|
| 6,814,190 B1* | 11/2004 | Olschewski | F16H 25/22 188/162 |
| 2006/0267402 A1 | 11/2006 | Leiter et al. | |
| 2007/0193835 A1* | 8/2007 | Wang | F16D 65/18 188/17 |
| 2015/0114769 A1* | 4/2015 | Kim | F16D 65/18 188/72.4 |
| 2015/0354645 A1 | 12/2015 | Cann | |
| 2016/0200294 A1* | 7/2016 | Takeo | F16H 1/04 188/156 |
| 2017/0130792 A1 | 5/2017 | Tandler et al. | |
| 2017/0152926 A1* | 6/2017 | Ikeda | F16H 25/2015 |
| 2018/0148030 A1 | 5/2018 | Kim | |
| 2019/0003535 A1 | 1/2019 | Esnee et al. | |
| 2021/0016756 A1* | 1/2021 | Usui | F16D 51/22 |
| 2023/0166707 A1* | 6/2023 | Kim | F16D 65/18 188/72.1 |
| 2024/0010176 A1* | 1/2024 | Milanesi | B60T 7/045 |

\* cited by examiner

HYDRAULIC AND ELECTROMECHANICAL SERVICE AND PARKING DISC BRAKE

FIELD

The present invention relates to a hydraulic and electromechanical service and parking disc brake, in particular for a car.

BACKGROUND

Electromechanical parking brakes and emergency brakes are known, provided with an electric rotary actuator and a screw-nut thrust assembly which acts on the hydraulic piston of the service disc brake or a special parking piston, if the parking brake constitutes an autonomous construction unit.

Electromechanical disc brakes are also known with a caliper body having two walls arranged on both sides of the brake disc and connected to each other by two or more connecting bridges which extend straddling the disc. The wall of the caliper body facing towards the inside of the vehicle comprises holes for accommodating the respective fastening screws for the rotationally fixed and translationally fixed fastening of the caliper body to the vehicle suspension. In both walls of the caliper body, a seat is obtained for accommodating a pad carrying a friction material coating facing towards the brake disc and at least one of the walls delimits one or more seats for a piston adapted to tighten the pads against the brake disc to generate the braking force. The piston, in turn, is connected to an electromechanical actuator. The electromechanical actuator comprises, for example, an electric motor, a transmission, and a reducer, which turns a screw which engages a corresponding nut. The nut is locked against rotation and free to translate and engages the piston or forms an integral part thereof. In this manner, a rotation of the screw causes a translation of the piston and of the corresponding pad against the brake disc.

The engagement between screw and nut of the electromechanical actuator (for the parking brake) can be configured with mechanical transmission irreversibility, i.e. an input rotation moment causes an output translational motion but (in the opposite direction) an input translation force does not cause an output rotation. As a result, following the application of the torque required to tighten the piston and pad against the braking band of the brake disc, such tightening remains self-locking also in the absence of the power supply of the motor.

The mechanical irreversibility of the transmission is achieved by a choice of the friction angle and the slope of the contact point of the threads or teeth of two gear parts, such as to prevent a transfer of the motion from the translating element to the rotating element. This concept will also be applied in the brake according to the present invention.

The electric motor and transmission must be electrically and mechanically dimensioned to be able to deliver a torque such to apply the required parking force, net of friction, to the piston.

SUMMARY

Due to the considerable dimensions of the electromechanical (parking) actuator, in the prior art, the electromechanical parking brake is usually integrated into so-called floating calipers, characterized by a unilateral hydraulic and electromechanical actuator, allowing the installation of the electromechanical actuator only on an inner side of the caliper, facing towards the inside of the vehicle and which has fewer problems of space.

The integration of electromechanical parking actuators in so-called fixed calipers with bilateral hydraulic actuator is currently problematic due to the need to provide the additional electromechanical actuator on both sides of the caliper, and thus also on the side facing towards the outside of the vehicle and directly facing the wheel rim, in addition to the hydraulic actuator. The fixed caliper concept with bilateral hydraulic actuator and bilateral electromechanical actuator still suffers from strong technical prejudice, mainly due to its high weight and considerable overall dimensions.

A further problem of the prior art relates to the mechanism that transforms the rotary motion of the electric motor into a translational motion applied onto the piston. The sliding element (screw or nut) is locked against rotation by shape coupling with the piston, the rotation of which is prevented only by friction with the lining and the backplate of the pad against which it abuts. The intensity of the "anti-rotation" friction of the piston is sometimes insufficient to prevent the rotation of the piston and, thus, of the translating element of the parking mechanism. The result is a possible reduction of the advancement of the piston and a corresponding reduction in the resulting parking force.

Furthermore, the shape coupling between the sliding element and the piston must achieve a translational stroke at least as long as the thickness of the friction material on the pad and consequently at least as long as the piston stroke. The prevision of the translational sliding zone in series with the nut-screw mechanism implies in an additional, undesirably great axial dimension.

It is the object of the present invention to provide a hydraulic and electromechanical service and parking disc brake having features such to avoid at least some of the drawbacks mentioned with reference to the prior art.

Within the general object, it is a particular object of the present invention to provide a hydraulic and electromechanical service and parking disc brake, suited to be implemented with a fixed caliper.

It is a further particular object of the present invention to provide a hydraulic and electromechanical service and parking disc brake having smaller overall dimensions than the solutions of the prior art.

It is a further particular object of the present invention to provide a hydraulic and electromechanical service and parking disc brake having an overall lighter weight with respect to the weight of the solutions of the prior art.

It is a further particular object of the present invention to provide a hydraulic and electromechanical service and parking disc brake in which the translatory stroke of the parking mechanism is not altered by undesired non-planned rotary slips of the piston.

It is a further particular object of the present invention to provide a hydraulic and electromechanical service and parking disc brake in which the rotation-translation conversion mechanism in the hydraulic piston-cylinder assembly is improved with respect to the prior art.

It is a further particular object of the present invention to provide a hydraulic and electromechanical service and parking disc brake with characteristics such as to obtain a greater piston displacement stroke certainty in dependency of the rotary stroke performed by the electric motor.

At least some of the aforementioned aims are achieved by means of a hydraulic and electromechanical service and parking disc brake according to claim 1. Some advantageous embodiments are the object of the dependent claims.

DESCRIPTION OF THE FIGURES

To better understand the invention and appreciate its advantages, some non-limiting embodiments will be described below with reference to the accompanying figures, in which.

DETAILED DESCRIPTION

General Description of the Caliper 2

Figure 1:
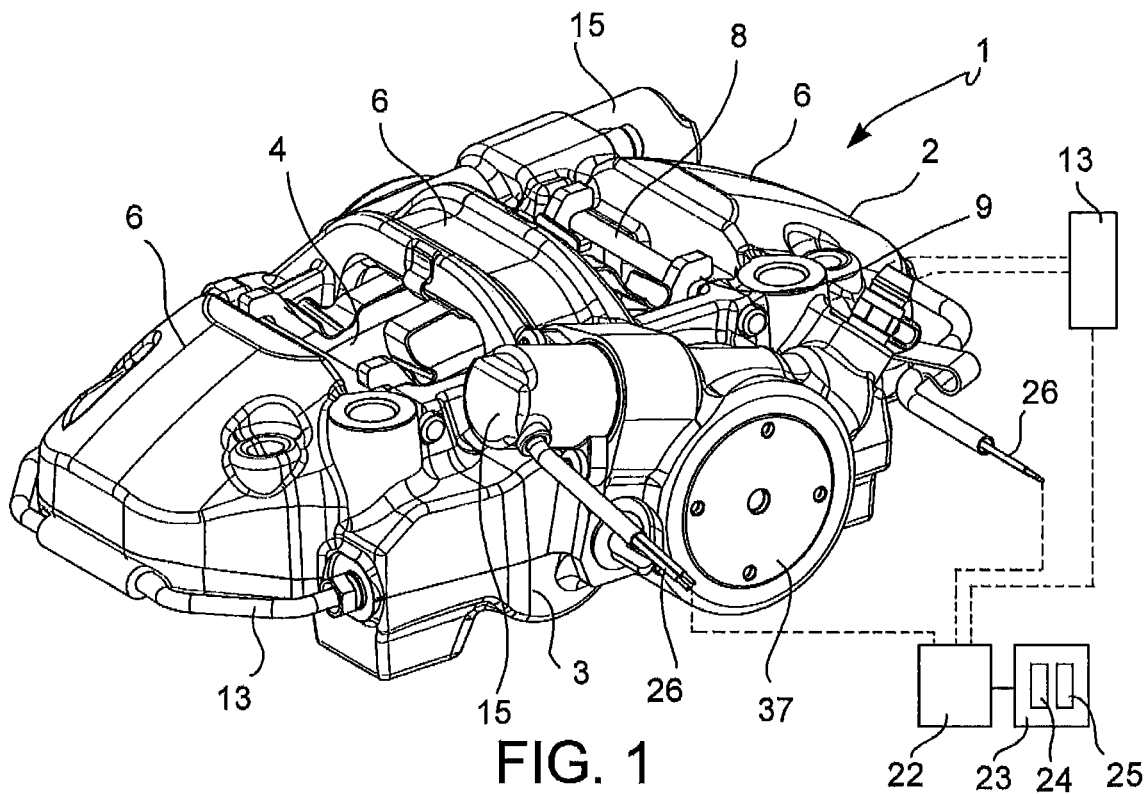
FIG. 1 is a perspective view of a disc brake according to an embodiment of the invention.
Figure 2:
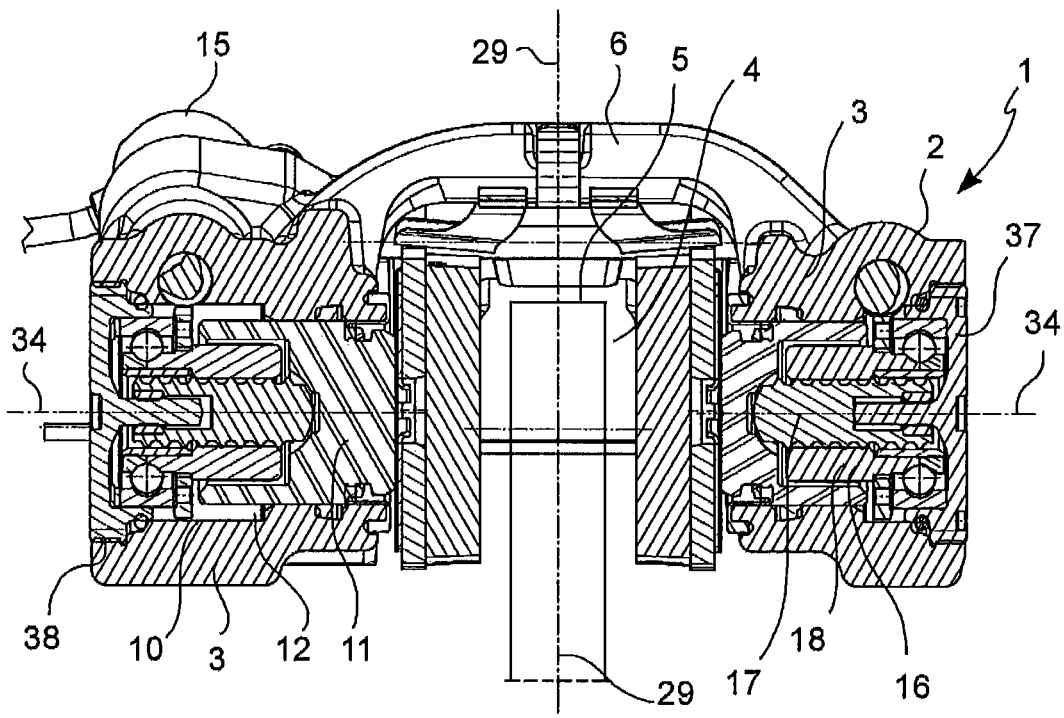
FIG. 2 is a section view of the disc brake in FIG. 1.

With reference to the figures, a hydraulic and electromechanical service and parking disc brake is globally indicated by reference numeral 1. The brake 1 comprises a caliper 2 with two mutually distanced side walls 3 which delimit a disc space 4 for accommodating a portion of a brake disc 5 (dashed line in FIG. 2). The brake 1 further comprises means for fastening the caliper 2 to the suspension of a vehicle. For example, said fastening means comprise at least two holes delimited by one of the side walls 3 and adapted to accommodate respective fastening screws.

The two walls 3 of the caliper 2 are connected to each other by at least one connecting structure 6 which extends straddling the disc space 4 and each of the walls 3 or a support portion connected to them delimits at least one seat for accommodating or supporting a pad 7.

According to an embodiment, the support portion comprises a support pin 8 connected to both side walls 3 and straddling the disc space 4. The pad support plates 7 delimit, in their upper part (radially external with reference to the axis of the brake disc) a hole or a seat 9 which receives the support pin 8 to constrain the pads 7 in a hanging manner from the caliper 2.

General Description of the Service Braking System 20

The brake 1 further comprises a service brake system 20, having (particularly in the case in which the caliper 2 is a fixed caliper) two hydraulic actuators 65, each positioned in one of the side walls 3 which can be activated to push the pads 7 against the brake disc 5 to tighten it.

Each of the hydraulic actuators 65 comprises a hydraulic cylinder 10 formed in the side wall 3 and a piston 11 accommodated in the hydraulic cylinder 10 and having a free end 14 facing the pad 7. An inner space 12 of the hydraulic cylinder 10 is in communication with a system 13 for feeding and pressurizing a hydraulic fluid for applying hydraulic pressure to the piston 11 and causing the piston 11 to translate in an actuating direction 19 towards the brake disc 5 and push the pad 7 against the brake disc 5.

According to an alternative embodiment, e.g. if the caliper 2 is a so-called floating caliper, the service brake system 20 may comprise a single hydraulic actuator 65 positioned in a single side wall 3 which can be activated to push the pad 7 against the brake disc 5 to tighten it. In this case, the hydraulic actuator 65 can be configured as described above.

General Description of the Parking Brake System 21

The brake 1 further comprises a parking brake system 21 having two electromechanical actuators 64 each positioned at one of the side walls 3 which can be activated to block the pads 7 against the brake disc 5.

Each electromechanical actuator 64 comprises:
- a screw-nut assembly 17, 18 having a rotary member 18 and a translational member 17 and configured to convert a rotary motion of the rotary member 18 into a translational motion of the translational member 17, wherein the screw-nut assembly 17, 18 is connected in the hydraulic cylinder 10 to translate and tighten the translational member 17 in the actuating direction 19 against the piston 11 to lock it,
- an electric motor 15 constrained on the side wall 3 and connected to a power supply 26 to actuate the screw-nut assembly 17, 18,
- a transmission mechanism 16 connected between the electric motor 15 and the rotary member 18,
- wherein the electromechanical actuators 64 are self-locking due to a transmission irreversibility (described more in detail in the introduction), so that, when the electric motor 15 is off, the translational stress of the translational member 17 cannot cause the rotation of the rotational member 18 and cannot make the translational member 17 move away from the brake disc 5.

According to an alternative embodiment, e.g. if the caliper 2 is a so-called floating caliper, the parking brake system 21 may comprise a single electromechanical actuator 64 positioned at only one of the side walls 3 and which can be activated to block the pads 7 against the brake disc 5. In this case, the single electromechanical actuator 64 can be configured as described above.

Description of the Control System 22

The brake 1 further comprises a control system 22 connected to the service braking system 20, to the parking system 21 and to a user interface 23, having, for example, a service braking control interface 24, e.g. a service pedal or a service button or a service lever, and a parking braking control interface 25, e.g. a parking pedal or a parking button or a parking lever.

The control system 22 may comprise an electric, electromechanical, electrohydraulic and/or electronic control system suited to control the pressurization of the hydraulic fluid and the activation of the electric motor 15. A control system 22 is configured and/or programmed to perform the control functions of the brake 1 in the desired manner.

According to an aspect of the invention, in response to a parking brake user command (even in the absence of a simultaneous service brake user command), the control system 22 actuates the parking brake system 21 (more precisely, the electric motor 15 in a forward direction) and also the service brake system 20 (more precisely, the hydraulic fluid supply system 13), using the service braking system 20 to move the piston 11 in the actuating direction 19 towards the brake disc 5 in a parking position in which it tightens the pad 7 against the brake disc 5, and using the parking braking system to lock the piston 11 in the parking position and prevent its return movement.

This makes it possible to dimension the electric motor 15 for a much lower electric power consumption and much lower torque than that required to push the piston 11 along its actuating stroke from a retracted position, away from the brake disc 5, up to a protracted parking position in which it tightens the brake pad 7 against the brake disc 5, because the advancement of the piston 11 and the tightening of brake disc 5 are, at least in part or completely, carried out by means of the service braking system 20.

For the same reason, also at least part of the transmission mechanism 16 can be designed for much less mechanical stress than that required to move and tighten the piston 11 in the parking braking position. With reference to an embodiment (FIGS. 9-13) which will be described in detail later, the motor pinion 55 of the electric motor 15 and a planetary reduction gear 58, comprising a planet carrier plate 61, toothed wheels 57 and ring gear 60 can be designed for mechanical stresses which are much less than those required to move and tighten the piston 11 in the parking position.

This results in a geometrical dimensioning and weight of the electromechanical actuator 64 which is reduced with respect to the solutions of the prior art, and in particular, a reduced axial dimensioning on the outer side of the vehicle is obtained, i.e. on the wheel rim side, which is necessary for implementing the concept in a fixed caliper.

On the other hand, the use of the hydraulic actuator 65 together with the electromechanical actuator 64 during the actuation of brake 1 as a parking brake does not imply any need to oversize the hydraulic actuator 65, which is already necessarily designed to apply service braking torques which are much higher than the parking braking torques.

The parking lock cannot be released by the electric motor 15 alone, because the load and friction on the translational member are equal to the total parking load/friction. The friction in the irreversibility point of the transmission is thus very high and the motor 15 is not, preferably, sized to overcome that friction. For this reason, in response to a user parking release command, the control system 22:
  first actuates the hydraulic actuator 65 to provide pressure on the piston 11 and unload the screw-nut assembly 17, 18 of the electromechanical actuator 64,
  when the screw-nut assembly 17, 18 is unloaded (and, therefore, in presence of considerably reduced friction) drives (the motor 15 of) the electromechanical actuator 64 to detach the translational member 17 from the piston 11,
  when the translational member 17 is detached from the piston 11, actuates the hydraulic actuator 65 to lower the hydraulic pressure again and interrupt the parking (step of actual releasing).

The lock of piston 11 in the parking position is released by disengaging and moving the translational member 17 away from the piston 11.

In an embodiment, in the case of a service braking user command and the absence of a parking braking user command, the control system actuates only the service braking system 20 without activating the parking braking system 21.

This ensures that the piston 11 can be quickly moved forth and back to perform service braking with the vehicle in motion, without the risk of impeding the return movement of the piston 11.

According to an embodiment, in response to a parking brake user command (also in the absence of a simultaneous service brake command), the control system 22:
  actuates the service braking system 20 (more specifically the hydraulic fluid feeding system 13) thereby moving the piston 11 in the parking direction in which it pushes the pad 7 against the brake disc 5,
  actuates the parking brake system 21 (more precisely the electric motor 15 in a forward direction) only after the actuation of the service braking system and with the piston 11 already in the parking position, i.e. with the brake disc 5 already tightened, thereby translating the translational member 17 in the actuating direction 19 against the piston 11 to lock it in the parking position and prevent a return movement thereof,
  once the piston 11 has been locked in the parking position, deactivates the service braking system 20 (more precisely the hydraulic fluid feeding system 13, thereby reducing the pressure of the hydraulic fluid) and turns the electric motor 15 off.

The piston 11 remains locked due to the transmission irreversibility of the electromechanical actuator 64.

This particular sequence of activation of the parking braking allows a precise and advantageous assignment of the functions of reaching the tightening of the brake disc 5 and retaining the tightening, to minimize or at least as much as possible the mechanical resistance and the electrical power required by the electromechanical actuator 64.

In a particularly advantageous embodiment, in which the caliper 2 is a fixed caliper:
  the actuation of the parking braking system 21 comprises the simultaneous actuation of both electric motors 15 on the two opposite sides of the caliper 2,
  the actuation of the service braking system 20 comprises the simultaneous operation of the hydraulic fluid feeding system 13 on two opposite sides of caliper 2,
  the deactivation of the parking braking system comprises switching off both electric motors 15 on two opposite sides of the caliper 2,
  the deactivation of the service braking system comprises the deactivation of the hydraulic fluid feeding system 13 on two opposite sides of the caliper 2.

Alternatively, in an embodiment in which the caliper 2 is for example a floating caliper:
  the actuation of the parking braking system 21 comprises the actuation of the electric motor 15 on only one actuating side of the caliper 2,
  the actuation of the service braking system 20 comprises the actuation of the hydraulic fluid feeding system 13 on the only one actuating sides of the caliper 2,
  the deactivation of the parking brake system 21 comprises switching off the single electric motor 15 on the only one actuating side of the caliper 2,
  the deactivation of the service braking system comprises the deactivation of the hydraulic fluid feeding system 13 on the only one actuating side of the caliper 2.

According to an embodiment (FIG. 3), which is also advantageous independently of the control system 22, the electric motor 15 of the electromechanical actuator 64 is fixed to the side wall 3 in a motor position in which a motor axis 27 (rotation axis of the rotor shaft) is oriented transversely, preferably perpendicular or tangential, but distanced, with respect to a middle axis 34 of the piston 11 which defines the aforementioned actuating direction 19. This reduces the overall dimensions of the brake 1 in the axial direction of the brake disc 5.

The motor axis 27 is advantageously tangent to a gear ring 42 of the rotary member 18, which will be described further.

With further advantage, the motor axis 27 extends on a drive plane 28 (FIG. 2) which is substantially parallel to a disc plane 29 of the brake disc 5, or which is inclined by less than 15° with respect to the disc plane 29.

Figure 3:
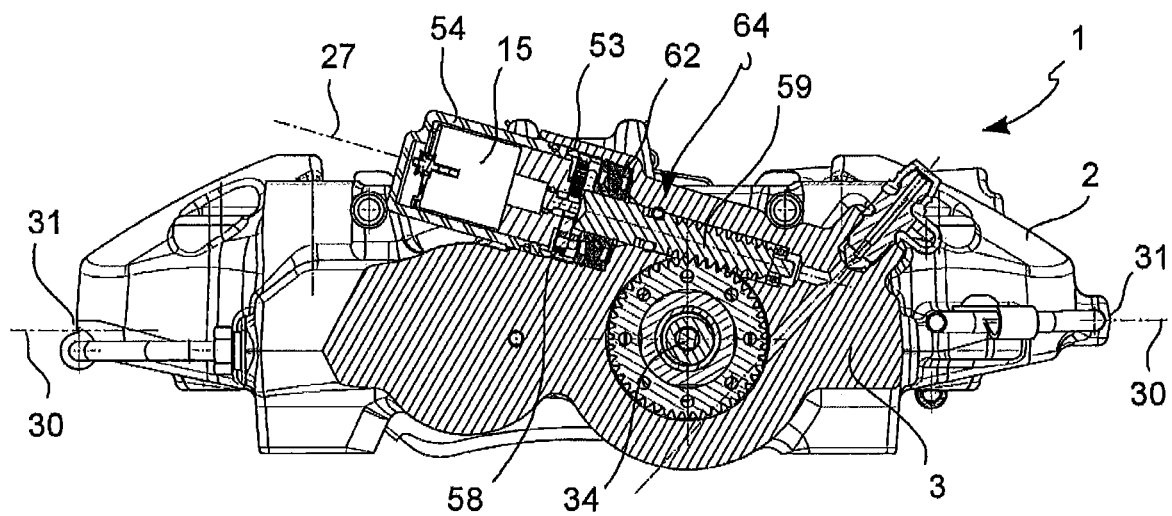
FIG. 3 is a further section view of the disc brake in FIG. 1.

Furthermore, the motor axis 27 is inclined by less than 30°, preferably less than 20° or less than 15°, with respect to a caliper plane 30 which is perpendicular to the disc plane 29 and extends between two opposite longitudinal ends 31 of the caliper 2 (FIG. 3).

The described positioning of the electric motor 15 further reduces the overall dimensions of brake 1 also in the radial direction of the brake disc 5.

Figure 7:
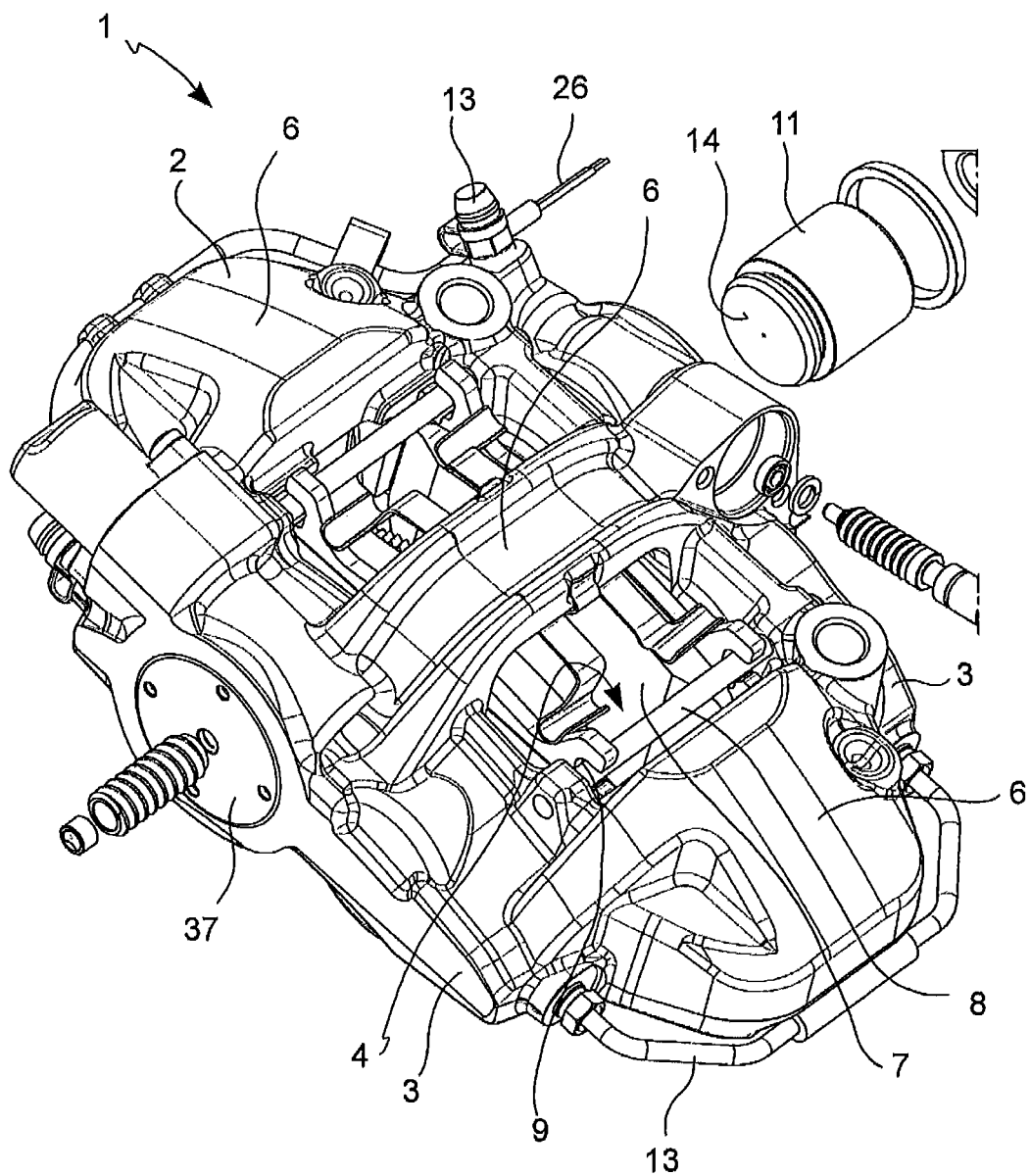
FIG. 7 is an exploded perspective view of parts of a disc brake according to an embodiment.
Figure 14:
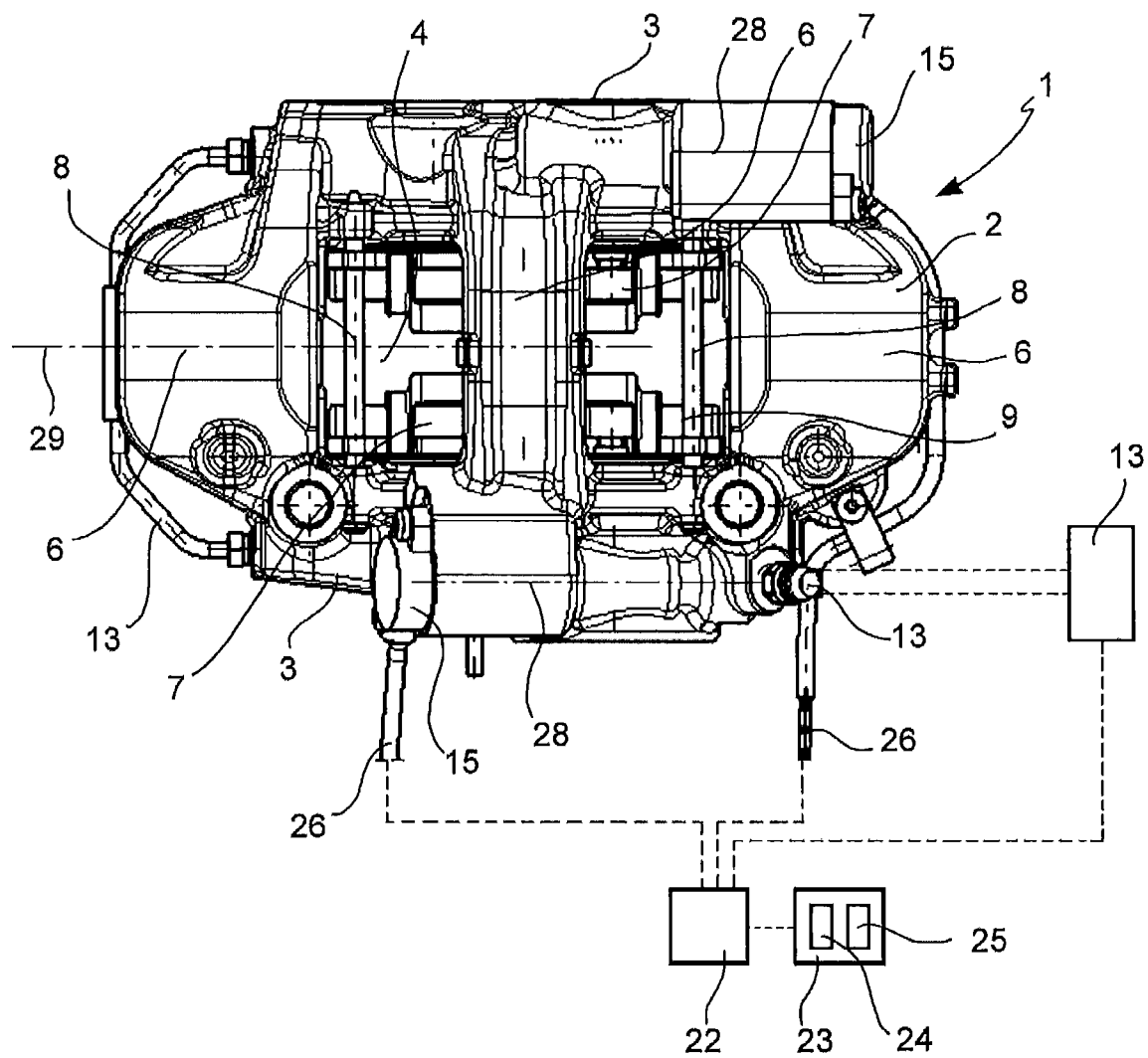
FIG. 14 is a top view of a disc brake according to an embodiment.

Advantageously, the two electric motors 15 on both sides of the caliper 2 are arranged in a non-symmetrical manner with respect to the disc plane 29 and in a non-symmetrical manner with respect to any plane which is radial to the rotation axis of the brake disc 5 (FIGS. 7, 14). This avoids the need to modify the vehicle interface on the inside and makes it easier to adapt to the wheel rim installation area.

One actuating side 32 of the electric motor(s) 15, on which the electric motor 15 is connected to the transmission mechanism 16, is radially more inner than the rotation axis of the brake disc 5, while a rear side 33 of the electric motor(s) 15, opposite to the actuating side 32, is radially more outer than the rotation axis of the brake disc 5. This positioning of the motors, on the one hand, leaves more space for further hydraulic cylinder-piston assemblies and, on the other hand, allows the transmission mechanism 16 to be brought closer to the middle axis 34 of the piston 11.

Advantageously, the two electric motors 15 on the two opposite sides of the caliper 2 face, with the actuating sides 32 thereof, towards opposite circumferential directions (with respect to the rotation axis of the brake disc 5). This also contributes to making the brake 1 more compact, in particular when the central axis 34 of the two opposing pistons 11, with which the parking brake system 21 is associated, is not in a middle position of the caliper, e.g. as shown in FIGS. 7 and 14.

According to a further aspect of the invention, advantageous also independently from the control system or the positioning of the electric motor 15, the translational member 17 is restrained to be rotationally integral with respect to the caliper 2 by means of an anti-rotation shape coupling with a guide portion 35 which is integral with the caliper 2 and is positioned on a rear side of the translational member 17, opposite to the free end 14 of the piston 11.

This obviates the need for an anti-rotation shape coupling between the translational member 17 and the piston 11 and the related problems of the uncertainty of the translational member stroke and further axial dimension, described with reference to the prior art.

Figure 4:
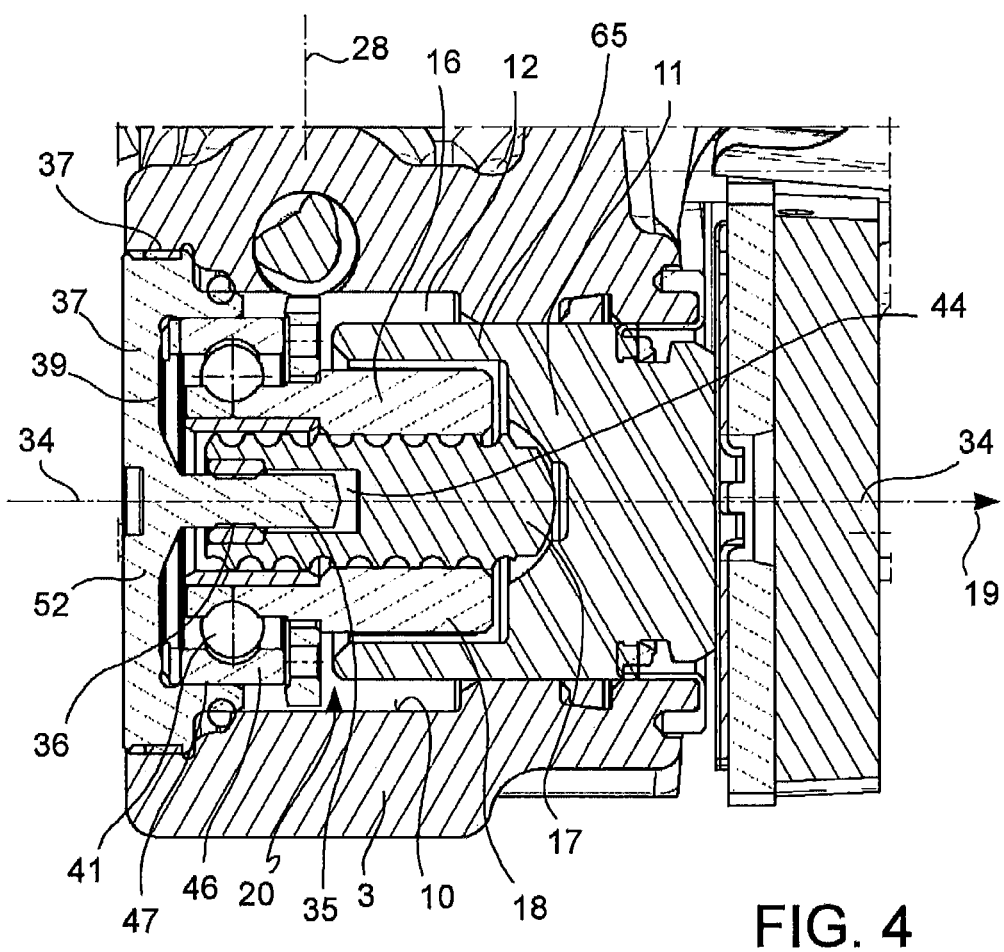
FIG. 4 is an enlarged view of a detail in FIG. 2.
Figure 5:
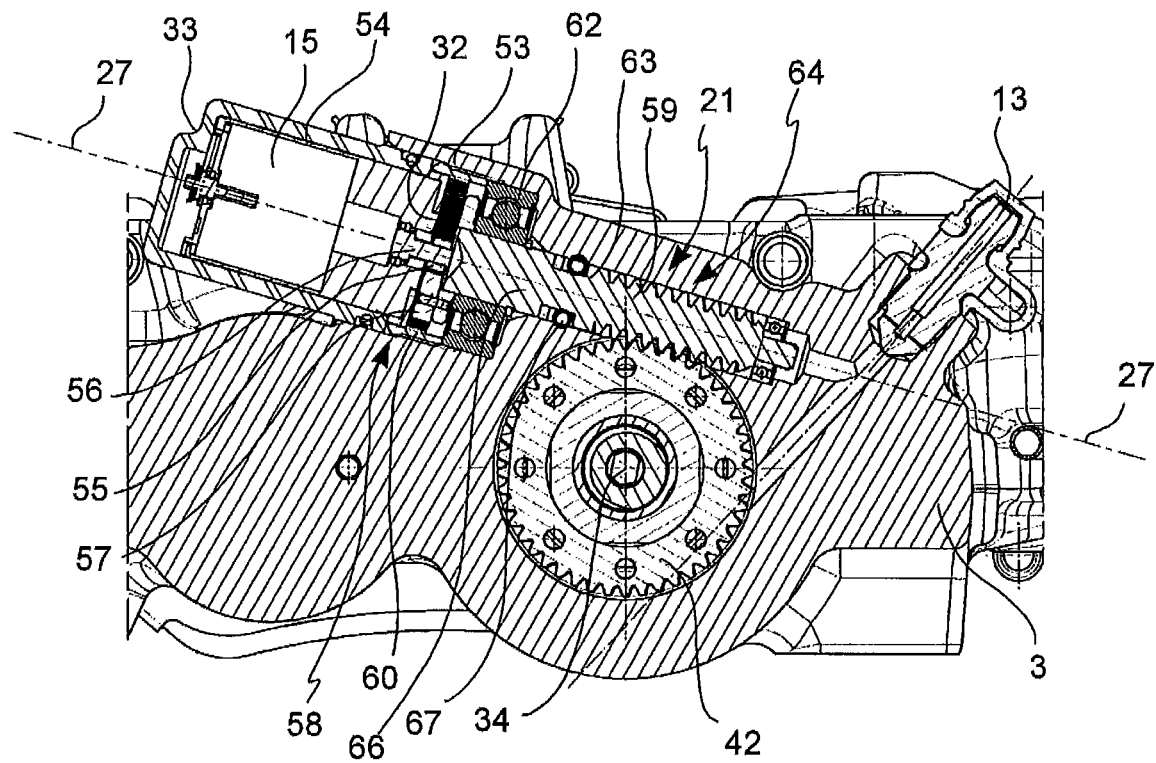
FIG. 5 is an enlarged view of a detail in FIG. 3.

According to an embodiment (FIGS. 2, 4, 6), the guide portion 35 protrudes from a bottom 39 of the hydraulic cylinder 10, preferably along the central axis 34 of the piston 11, and is accommodated slidingly but without any possibility of relative rotation (about the central axis 34) in a corresponding guide seat 36 formed in the translational member 17.

The anti-rotation shape coupling can be achieved by means of complementary, non-circular, e.g. polygonal or toothed cross-section shapes of the guide portion 35 and the guide seat 36.

Advantageously, the guide portion 35 is formed in a cylinder plug 37, e.g. externally threaded, which can be screwed into a corresponding plug seat 38, e.g. internally threaded, of the caliper 2. The cylinder plug 37 can be screwed into plug seat 38 to close hydraulic cylinder 10 to the outside of the caliper 2 and to form the bottom 39 of the hydraulic cylinder 10.

According to an embodiment, the cylinder plug 37 comprises a base plate 52 which is substantially flat and circular, and preferably coaxial with the central axis 34 of the piston 11. The guide portion 35 protrudes from the base plate 52 towards the brake disc 5.

The planar and circular shape of the base plate 52 allows fastening of the cylinder plug 37, e.g. by screwing, in different angular positions without altering the exterior appearance of the caliper 2 and the interior mechanical configuration of the electromechanical actuator 64.

According to an embodiment, the cylinder plug 37 supports and positions a motion conversion assembly 40, preferably prefabricated and self-supporting, which comprises:
the cylinder plug 37 itself,
the translational member 17 which is rotationally integral with the cylinder plug 37 by means of the non-rotatable but translational coupling with the guide portion 35,
the rotary member 18 restrained to the cylinder plug 37 in a rotational manner about the central axis 34 but not translational along the central axis 34, e.g. by means of a bearing 41 fastened to the cylinder plug 37 preferably at the bottom 39 of the hydraulic cylinder 10, wherein the rotary member 18 is screwed either directly or indirectly (e.g. by means of the interposition of balls or planetary rolling bodies) with the translational member 17.
a gear ring 42 either formed or fixed to the rotary member 18 preferably immediately adjacent to the bearing 41.

The motion conversion assembly 40 can be easily and quickly connected to and disconnected from caliper 2 in a single assembly/disassembly operation, while its individual components can be assembled and tested independently from the assembly to the caliper 2.

Figure 6:
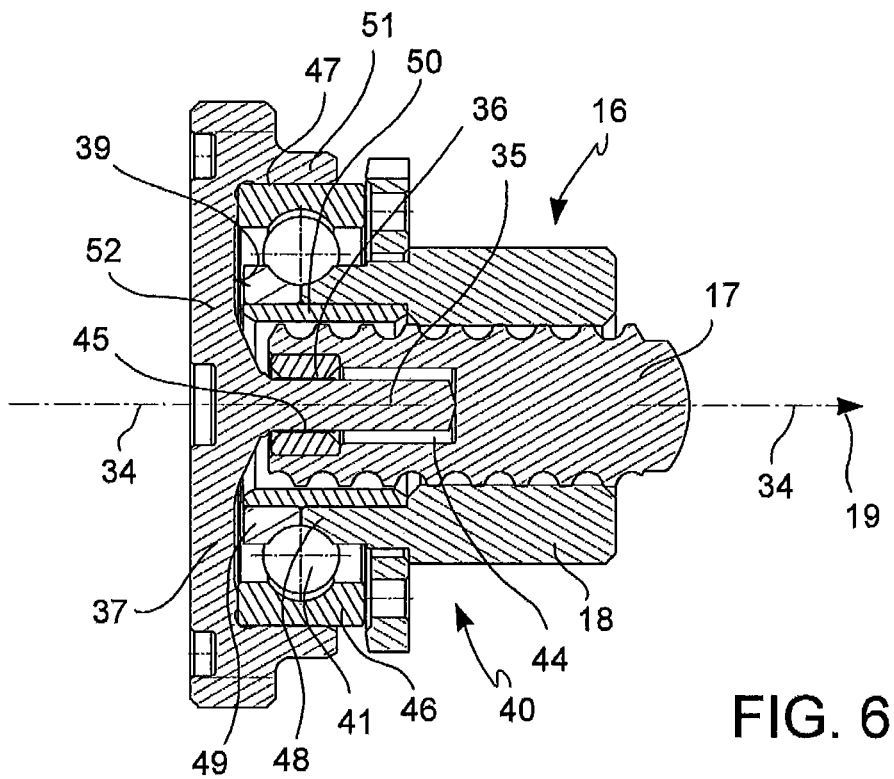
FIG. 6 is a section view of an assembly, in pre-assembled form, of a disc brake according to an embodiment.
Figure 8:
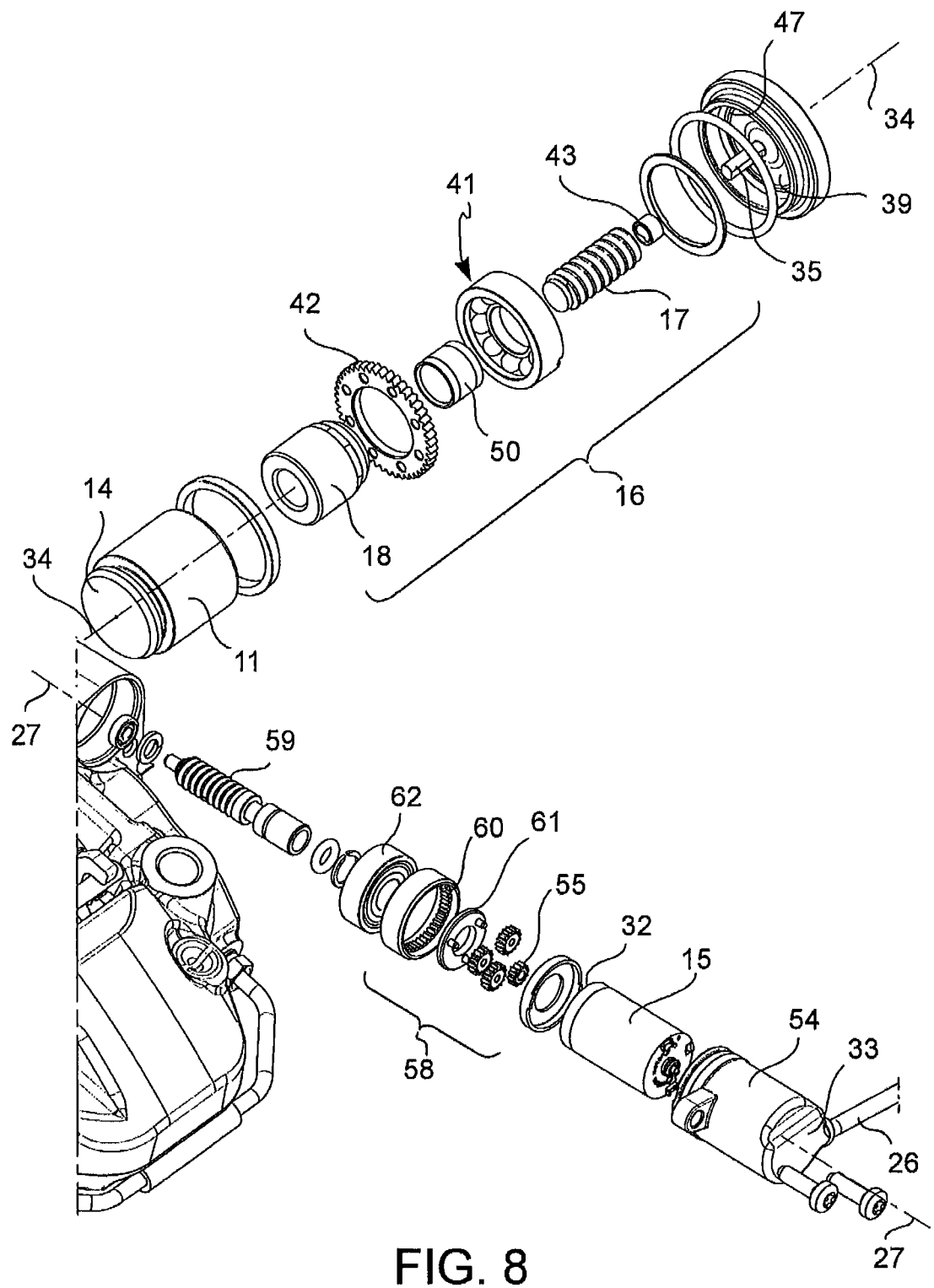
FIG. 8 is an exploded perspective view of parts of a disc brake according to an embodiment.
Figure 9:
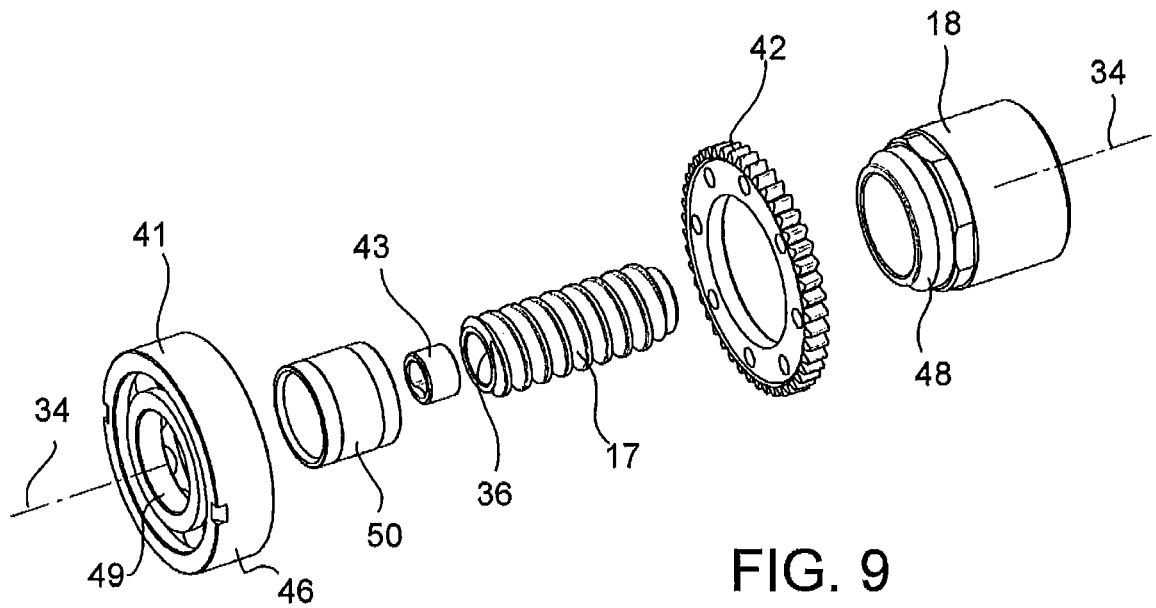
FIG. 9 is an exploded view of a detail of an electromechanical parking mechanism of the disc brake according to an embodiment.
Figure 10:
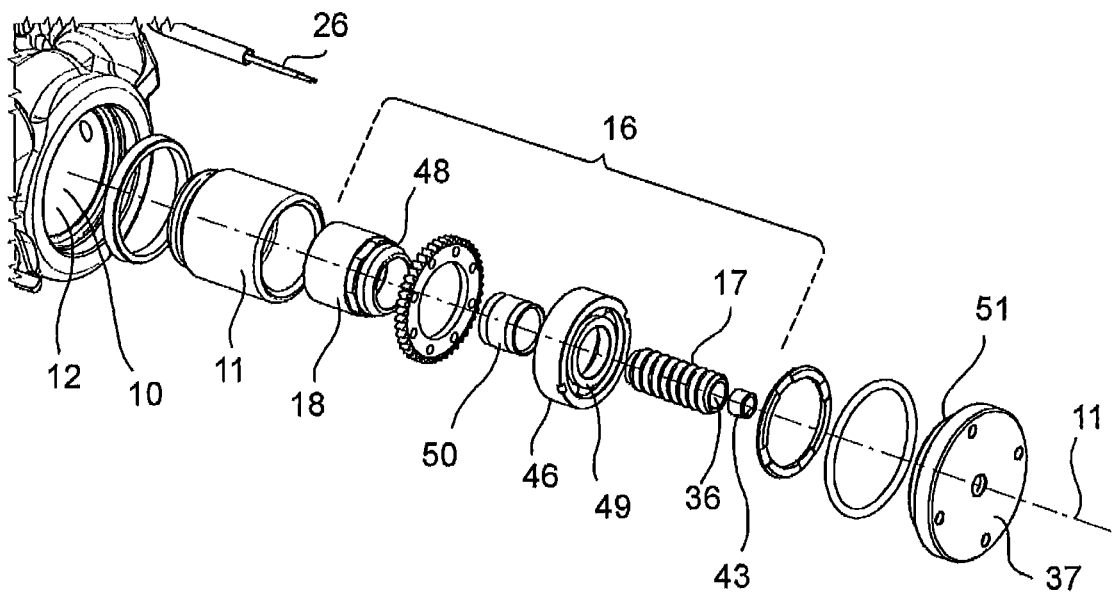
FIG. 10 is an exploded view of a detail of an electromechanical parking mechanism of the disc brake according to an embodiment.
Figure 11:
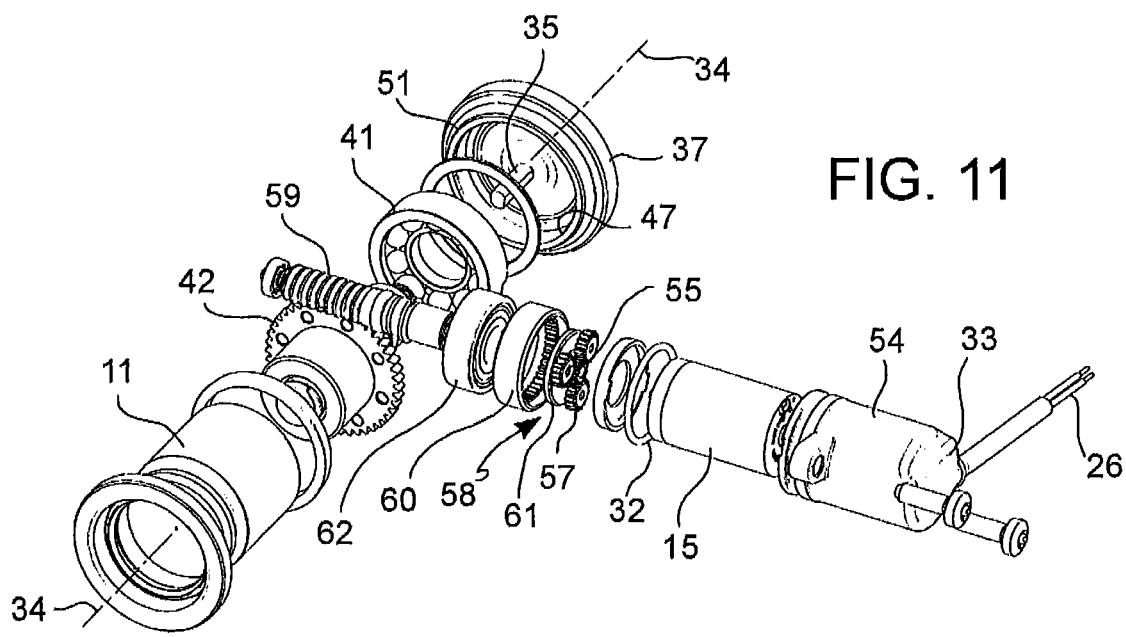
FIG. 11 is an exploded view of an electromechanical parking mechanism of the disc brake according to an embodiment.
Figure 12:
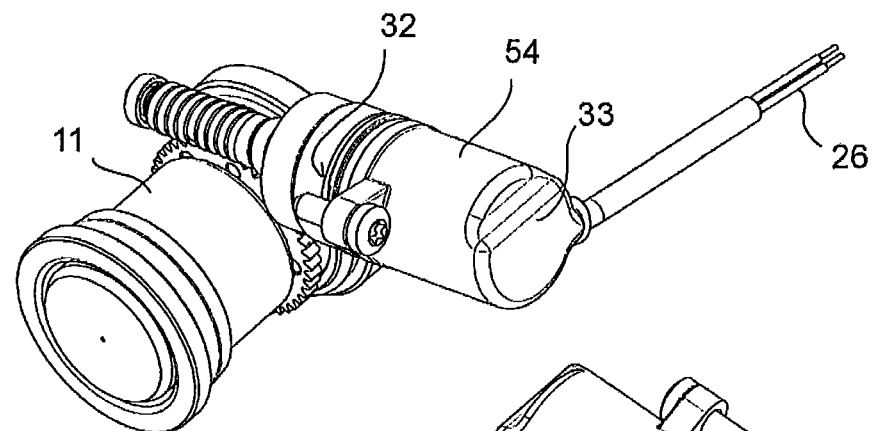
FIG. 12 shows the electromechanical parking mechanism in FIG. 11 in assembled configuration.
Figure 13:
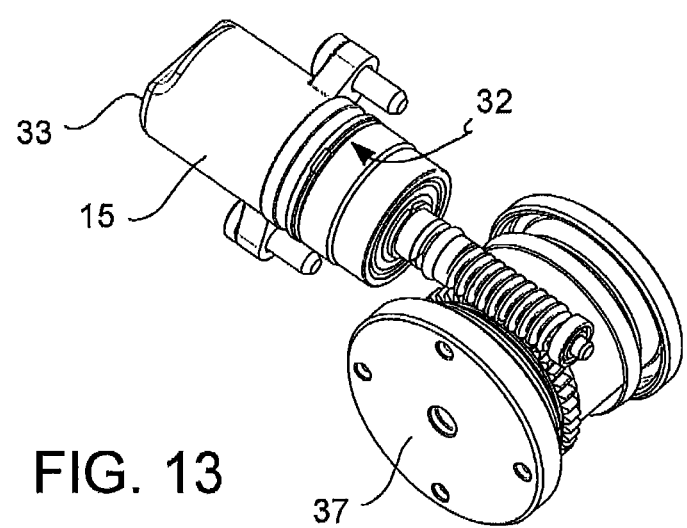
FIG. 13 shows the electromechanical parking mechanism in FIG. 11 in assembled configuration.

Furthermore, as can be seen from FIGS. 6 and 8, the motion conversion assembly 40 configured in this manner is particularly compact, both axially and radially, and can, therefore, be easily positioned inside the assembly of cylinder 10—piston 11.

According to an embodiment, the guide seat 36 comprises a sliding bushing 43 manufactured separately from the translational member 17, possibly in a different material, and mounted with interference in an axial hole 44 of the translational member 17. The axially sliding and rotationally locked shape coupling between the translational part 17 and the caliper 2 takes place (exclusively) in a sliding interface 45 between the sliding bushing 43 and the guide portion 35.

This avoids complex mechanical machining of the rotating member 17 and makes it possible to differentiate and optimize the material and size of the different functional portions of the motion conversion assembly 40.

According to an embodiment (FIGS. 4, 6, 9) the bearing 41 comprises:
an outer ring 45 forming an outer raceway and mounted, preferably by interference, in a bearing seat 47 of the cylinder plug 37,
a first inner half-ring 48 formed in one piece with the rotary member 18,
a second inner half-ring 49 made separately from the first inner half-ring 48 and forming an inner raceway together with the first inner half-ring 48, a union bushing 50 having a first end portion mounted, preferably by interference, in the first inner half-ring 48 and a second end portion mounted, preferably by interference, in the second inner half-ring 49, to connect the first and second inner half-ring 48, 49 to one another.

This reconciles the assembly requirements with the need for compacting the mechanism.

Advantageously, the bearing seat 47 is formed by a concentric annular wall 51 with the guide portion 35 and protruding from the base plate 52 of the cylinder plug 37 towards the brake disc 5.

According to a preferred embodiment, the translational member 17 is an inner screw and the rotary member 18 is an outer nut 18 of screw-nut assembly 17, 18.

The motion conversion assembly 40 can be advantageously, precisely and simply mounted according to the sequence of steps:
- screwing the translational member (screw 17) into the rotating member (nut 18),
- mounting by interference of the sliding bushing 43 in the axial hole 44 of the translational member 17,
- mounting by interference of ring gear 42 on the rotary member 18,
- mounting by interference of the union bushing 50 in the translational member 17,
- mounting by interference of the assembly of outer ring 46, rolling elements and second inner half-ring 49, onto the union bushing 50 to complete the bearing 41,
- mounting for interference of the cylinder plug 37 onto the outer ring 46 of the bearing 41,
- mounting of the cylinder plug 37 in the side wall 3 of the caliper 2 by screwing.

According to a further embodiment, the electric motor 15 is at least partially housed in a motor housing formed in one piece with the caliper 2 and, advantageously, no additional motor housing or casing is provided, distinct from the caliper 2 and connected to it. On the contrary, a support structure 55 of the motor (which is inseparable from the motor 15) is directly screwed to the caliper 2.

The elimination of a distinct motor housing from caliper 2 further reduces the overall dimensions, weight, and cost of the brake 1.

As described above, the motion conversion assembly 40 or the screw-unit assembly 17, 18 is coaxial with the central axis 34 of the piston 11.

Conversely, the electric motor 15 and the transmission mechanism 16 are oriented either transversely or in a direction tangential to the middle axis 34.

According to an embodiment, the transmission mechanism 16 comprises a single-stage planetary reduction gear 58 connected to motor 15, and a worm screw 69 connected to the planetary reduction gear 58 and which meshes with the ring gear 42 of the rotary member 18. The motor 15, the planetary reduction gear 58, and worm screw 59 are coaxial to one another and to the motor axis 27. This further reduces the overall dimensions of the brake 1, for the reasons already described in relation to the positioning of the electric motor 15 alone.

According to a preferred embodiment, a motor pinion 55 formed on the end of the motor shaft 56 meshes with planetary gears 57 of the planetary reduction gear 58, so that the motor pinion 55 forms the central pinion of the first reduction stage of the planetary reduction gear 58. The planetary toothed wheels 57 mesh with an internally toothed ring gear 60 which is stationary in the side wall 3 of the caliper 2. The planetary toothed wheels 57 are supported by a satellite carrier plate 61 fixed to the worm screw 59 which, in turn, is rotationally supported by a bearing 62 in the side wall 3 of the caliper 2. According to an embodiment, wherein the transmission irreversibility point is achieved in the engagement region between the worm screw 59 and the ring gear 52, the electric motor 15 and the transmission from the electric motor 15 to the transmission irreversibility point, i.e. up to the worm screw 59 can be dimensioned for the (reduced) stress only that is required to move the translational member of the worm screw unit up to the piston 11. The screw-nut and ring gear assembly, i.e. up to the point of irreversibility starting from the piston, must instead be sized to withstand the entire parking clamping load.

The electromechanical actuator 64 is housed in a cavity 63 formed in the side wall 3 of the caliper 2 and extended from the motor housing 53 to the hydraulic cylinder 10, in which a sealing gasket 67 between cavity and a sealing portion 66 of the worm gear 59 separates the inner space 12 of the hydraulic cylinder from the motor housing 53, preferably in a sealing position between the planetary reduction gear 58 and a gear zone of the worm gear 59 with the ring gear 52 of the rotary member 18.

In the embodiments in which two electric motors are provided 15, said electric motors can be electrically connected in the following manners:
- independently, i.e. each motor is connected to the electric power supply directly;
- in a parallel circuit, i.e. all the positive and, respectively, all the negative terminals are connected to each other and to the power supply;
- in a series circuit, i.e. the negative terminal of one motor is connected to the positive terminal of the next.

Obviously, a person skilled in the art may make further changes and variants to the brake 1 according to the present invention all without departing from the scope of protection of the invention, as defined in the following claims.

The invention claimed is:

1. A hydraulic and electromechanical service and parking disc brake, comprising:
   a caliper with two side walls which delimit a disc space therebetween for accommodating a portion of a brake disc,
   a device for fastening the caliper to a suspension of a vehicle,
   at least two pads each supported by one of the side walls, respectively,
   a service braking system, having a hydraulic actuator positioned in one of the side walls,
   wherein the hydraulic actuator comprises a hydraulic cylinder formed in the side wall and a piston accommodated in the hydraulic cylinder and having a free end facing one of the at least two pads,
   wherein said one of the at least two pads is supported by the same side wall in which the hydraulic actuator is positioned,
   wherein the hydraulic cylinder is in communication with a system for feeding and pressurizing a hydraulic fluid for applying a hydraulic pressure to the piston and causing the piston to translate in an actuating direction towards the brake disc and tighten the pad against the brake disc,
   a parking braking system having an electromechanical actuator positioned at one of the side walls,
   wherein the electromechanical actuator comprises:
   a screw-nut assembly having a rotary member and a translational member and configured to convert a rotary motion of the rotary member into a translational motion of the translational member, wherein the screw-nut assembly is connected in the hydraulic cylinder so as to be able to translate and tighten the translational member in the actuating direction against the piston in order to lock the piston, an electric motor connected to a power supply to actuate the screw-nut assembly, a transmission mechanism connected between the electric motor and the rotary member, wherein said at least one electromechanical actuator is self-locking due to transmission irreversibility thereof so that, when the electric motor is off, a translational stress of the translational member cannot cause the translational member to move away from the brake disc, a control system connected to the service braking system and to the parking system and to a user interface, wherein the translational member is restrained to be rotationally locked with respect to the caliper via an anti-rotation shape coupling with a guide portion which is fixed with the caliper and is arranged on a rear side of the translational member, opposite to the free end of the piston.

2. A disc brake according to claim 1, wherein the guide portion protrudes from a bottom of the hydraulic cylinder and is slidingly accommodated, but without the possibility of relative rotation, in a guide seat formed in the translational member.

3. A disc brake according to claim 1, wherein the guide portion is formed in a cylinder plug screwed in a plug seat of the caliper, wherein the cylinder plug closes the hydraulic cylinder and forms the bottom of the hydraulic cylinder.

4. A disc brake according to claim 3, wherein the cylinder plug supports a pre-assembled and self-supporting motion conversion assembly, comprising:

the cylinder plug, the translational member which is rotationally locked with the cylinder plug via the non-rotatable but translationally slidable coupling with the guide portion, the rotary member restrained to the cylinder plug in a rotational manner but not translational manner, via a bearing fastened to the cylinder plug at the bottom of the hydraulic cylinder, wherein the rotary member is screwed with the translational member, a gear ring formed at the rotary member adjacent to the bearing.

5. A disc brake according to claim 1, wherein the electric motor is fastened to one of the side walls of the caliper in a motor position in which a motor axis is oriented perpendicular or tangent to, but spaced apart from, a middle axis of the piston which defines the actuating direction.

6. A disc brake according to claim 1, wherein:

a motor axis is tangent to a gear ring of the rotary member, the motor axis extends in a motor plane which is substantially parallel to a disc plane of the brake disc, the motor axis is inclined by less than 30° with respect to a caliper plane which is perpendicular to the disc plane and which extends between two opposite longitudinal ends of the caliper.

7. A disc brake according to claim 1, wherein:

two of said electric motors are provided, one of said two electric motors being arranged on each one of two opposite sides of the caliper, said two electric motors are arranged in a non-symmetrical manner with respect to a disc plane and in a non-symmetrical manner with respect to any plane which is radial to the rotation axis of the brake disc;

two of said transmission mechanisms are provided, one of said transmission mechanisms being arranged on each one of two opposite sides of the caliper, each of said two electric motors has an actuating side connected respectively to one of the two transmission mechanisms and a rear side, said actuating side being radially further inward than said rear side with respect to the rotation axis of the brake disc, the two electric motors on the two opposite sides of the caliper face, with the actuating sides thereof, towards opposite circumferential directions of the brake disc.

8. A disc brake according to claim 1, wherein:

the electric motor is at least partially accommodated in a motor housing formed in one piece with the caliper, and a support structure of the motor which is inseparable from the motor is directly screwed to the caliper.

9. A disc brake according to claim 5, wherein the transmission mechanism is coaxial to the motor axis.

10. A disc brake according to claim 1, wherein the transmission mechanism comprises:

a planetary reduction gear having only one reduction stage, connected to the motor, and a worm screw connected to the planetary reduction gear and meshing with a gear ring of the rotary member.

11. A disc brake according to claim 1, wherein:

the electromechanical actuator is accommodated in a cavity formed in one of the side walls of the caliper and extending from a motor housing up to the hydraulic cylinder, a sealing gasket between the cavity and a sealing portion of the electromechanical actuator sealingly separates the inner space of the hydraulic cylinder from the motor housing.

12. A disc brake according to claim 1, wherein:

the caliper is a fixed caliper, and the service braking system comprises two of said hydraulic actuators, each positioned in one of the side walls, respectively, the parking braking system comprises two of said electromechanical actuators, each positioned at one of the side walls, respectively.

13. A disc brake according to claim 1, wherein in response to a user parking braking command, the control system actuates:

the service braking system to move the piston in the actuating direction towards the brake disc in a parking position in which it tightens the pad against the brake disc, and the parking braking system for locking the piston in the parking position and for preventing a return movement of the piston.

14. A disc brake according to claim 13, wherein in response to a user parking release command:

the control system first actuates the hydraulic actuator to provide pressure on the piston and unload the screw-nut assembly of the electromechanical actuator, when the screw-nut assembly is unloaded, the control system actuates the electromechanical actuator to detach the translational member from the piston, when the translational member is detached from the piston, the control system actuates the hydraulic actuator to lower the hydraulic pressure again and interrupt the parking braking.

15. A disc brake according to claim 14, wherein in response to the user parking braking command:
- the control system actuates the service braking system by moving the piston in the parking position where it pushes the pad against the brake disc,
- the control system actuates the electric motor in a forward direction only upon the actuation of the service braking system and with the piston already in the parking position, by translating the translational member in the actuating direction against the piston to lock it in the parking position and prevent a return movement thereof,
- once the piston has been locked in the parking position, the control system deactivates the service braking system by reducing the pressure of the hydraulic fluid, and turns the electric motor off,
- wherein the piston remains locked due to the transmission irreversibility of the electromechanical actuator.

* * * * *